United States Patent
Colon et al.

(10) Patent No.: US 8,489,854 B1
(45) Date of Patent: *Jul. 16, 2013

(54) NON-VOLATILE SEMICONDUCTOR MEMORY STORING AN INVERSE MAP FOR REBUILDING A TRANSLATION TABLE

(71) Applicant: Western Digital Technologies, Inc., Irvine, CA (US)

(72) Inventors: Kevin M. Colon, Mission Viejo, CA (US); Charles P. Rainey, III, Laguna Niguel, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/670,228

(22) Filed: Nov. 6, 2012

Related U.S. Application Data

(63) Continuation of application No. 12/714,350, filed on Feb. 26, 2010, now Pat. No. 8,407,449.

(51) Int. Cl.
*G06F 12/10* (2006.01)

(52) U.S. Cl.
USPC ........... 711/206; 711/154; 711/156; 711/159; 711/165; 711/205; 711/207; 711/103

(58) Field of Classification Search
USPC .......................... 711/103, 154, 156, 159, 165
See application file for complete search history.

(56) References Cited

U.S. PATENT DOCUMENTS

| | | | |
|---|---|---|---|
| 7,363,421 B2 | 4/2008 | Di Sena et al. |
| 7,412,585 B2 | 8/2008 | Uemura |
| 7,441,067 B2 | 10/2008 | Gorobets et al. |
| 7,509,471 B2 | 3/2009 | Gorobets |
| 7,610,438 B2 | 10/2009 | Lee et al. |
| 8,095,851 B2 | 1/2012 | Diggs et al. |
| 2004/0088474 A1 | 5/2004 | Lin |
| 2004/0109376 A1 | 6/2004 | Lin |
| 2006/0155917 A1 | 7/2006 | Di Sena et al. |
| 2007/0016721 A1 | 1/2007 | Gay |
| 2007/0094445 A1 | 4/2007 | Trika et al. |
| 2007/0204128 A1 | 8/2007 | Lee et al. |
| 2007/0300037 A1 | 12/2007 | Rogers et al. |
| 2008/0104308 A1 | 5/2008 | Mo et al. |
| 2008/0256287 A1 | 10/2008 | Lee et al. |
| 2008/0282024 A1 | 11/2008 | Biswas et al. |
| 2009/0019218 A1 | 1/2009 | Sinclair et al. |

(Continued)

OTHER PUBLICATIONS

Office Action dated Apr. 24, 2012 from U.S. Appl. No. 12/714,350, 9 pages.

(Continued)

*Primary Examiner* — John Lane

(57) ABSTRACT

A non-volatile semiconductor memory comprising (1) a non-volatile memory array including a plurality of blocks with at least some of the plurality of blocks comprising a plurality of memory segments and with at least some of the plurality of memory segments each assigned a physical address and (2) a volatile memory. Upon a power-up of the non-volatile semiconductor memory, a translation table is generated in the volatile memory for mapping logical addresses to physical addresses in the non-volatile memory array. The generating includes reading at least one entry comprising a logical address from an inverse map stored in the non-volatile memory array. The logical address corresponds to a physical address of one of the memory segments. In response to determining that the memory segment corresponding to the logical address is valid, the translation table is updated using the logical address.

22 Claims, 8 Drawing Sheets

U.S. PATENT DOCUMENTS

| | | |
|---|---|---|
| 2009/0119353 A1 | 5/2009 | Oh et al. |
| 2009/0150599 A1 | 6/2009 | Bennett |
| 2009/0177931 A1 | 7/2009 | Song et al. |
| 2009/0222643 A1 | 9/2009 | Chu |
| 2009/0240873 A1 | 9/2009 | Yu et al. |
| 2009/0241008 A1 | 9/2009 | Kim et al. |
| 2009/0241009 A1 | 9/2009 | Kong et al. |
| 2009/0259805 A1 | 10/2009 | Kilzer et al. |
| 2009/0292972 A1 | 11/2009 | Seol et al. |
| 2010/0174851 A1 | 7/2010 | Leibowitz et al. |
| 2010/0211851 A1 | 8/2010 | Dixon |
| 2010/0241928 A1 | 9/2010 | Kim et al. |
| 2010/0268871 A1 | 10/2010 | Lee et al. |
| 2010/0306451 A1 | 12/2010 | Johnson |
| 2011/0055458 A1 | 3/2011 | Kuehne |
| 2011/0066788 A1 | 3/2011 | Eleftheriou et al. |
| 2011/0072333 A1 | 3/2011 | Kuo |
| 2011/0099321 A1 | 4/2011 | Haines et al. |
| 2011/0099350 A1 | 4/2011 | Feldman et al. |
| 2011/0119464 A1 | 5/2011 | Karr et al. |
| 2011/0191566 A1 | 8/2011 | Takamiya et al. |
| 2011/0191654 A1 | 8/2011 | Rub |
| 2011/0225346 A1 | 9/2011 | Goss et al. |
| 2011/0252289 A1 | 10/2011 | Patapoutian et al. |
| 2011/0283049 A1 | 11/2011 | Kang et al. |
| 2011/0320915 A1 | 12/2011 | Khan |
| 2012/0023387 A1 | 1/2012 | Wang et al. |
| 2012/0072807 A1 | 3/2012 | Cornwell et al. |

OTHER PUBLICATIONS

Notice of Allowance dated Aug. 15, 2012 from U.S. Appl. No. 12/714,350, 9 pages.

PA->LA MAP
BLOCK N

| BL$_0$ | BL$_1$ | ... | BL$_N$ | PAGE 0 – LIST OF BLOCKS WRITTEN |
| LA$_0$ | LA$_1$ | ... | LA$_N$ | PAGE 1 – LIST OF LBAs FOR BL$_0$ |
| LA$_0$ | LA$_1$ | ... | LA$_N$ | PAGE 2 – LIST OF LBAs FOR BL$_1$ |
| ... | ... | ... | ... | |
| LA$_0$ | LA$_1$ | ... | LA$_N$ | PAGE N – LIST OF LBAs FOR BL$_N$ |

PA->LA MAP
BLOCK N+1

| BL$_0$ | BL$_1$ | ... | BL$_N$ | PAGE 0 – LIST OF BLOCKS WRITTEN |
| LA$_0$ | LA$_1$ | ... | LA$_N$ | PAGE 1 – LIST OF LBAs FOR BL$_0$ |
| LA$_0$ | LA$_1$ | ... | LA$_N$ | PAGE 2 – LIST OF LBAs FOR BL$_1$ |
| ... | ... | ... | ... | |
| LA$_0$ | LA$_1$ | ... | LA$_N$ | PAGE N – LIST OF LBAs FOR BL$_N$ |

FIG. 7

NON-VOLATILE SEMICONDUCTOR MEMORY STORING AN INVERSE MAP FOR REBUILDING A TRANSLATION TABLE

CROSS-REFERENCE TO RELATED APPLICATION

This application is a continuation application from U.S. application Ser. No. 12/714,350, filed Feb. 26, 2010, the disclosure of which is hereby incorporated by reference.

BACKGROUND

A non-volatile semiconductor memory may be employed as mass storage for a computer system (e.g., desktop, laptop, portable, etc.) or a consumer device (e.g., music player, cell phone, camera, etc.) or other suitable application. The non-volatile semiconductor memory may comprise one or more memory devices (such as a flash memory) and control circuitry for accessing each memory device. Each memory device is coupled to an I/O bus, as well as a number of interface control lines. When issuing a program command or an erase command to a memory device, the control circuitry transfers the address and command data (and write data for a program operation) over the I/O bus. When issuing a read command, the control circuitry transfers the address and command data over the I/O bus and then receives the read data over the I/O bus.

Each memory device typically comprises a number of blocks which are accessed a page at a time. For example, a single block may comprise 128 pages where each page comprises 4096 bytes. Since a page typically cannot be overwritten without first being erased, a new page in a different block is typically selected to perform an "overwrite" operation. Accordingly, the address translation layer must maintain the appropriate logical address to physical address mapping as each write operation changes the physical location of the user data (similar to a log-structured file system).

When the non-volatile semiconductor memory is powered on, it typically loads a translation table from the non-volatile memory into a volatile memory (e.g., DRAM) for on-the-fly mapping of logical addresses to physical addresses when performing access operations. After executing a number of write operations and updating the translation table, the translation table is stored to the memory device to ensure the updates are saved. However, storing the updated translation table to the memory device requires a significant amount of time due to its size which may decrease performance as well as increase the number of erase/write cycles needed to maintain the translation table (write amplification).

BRIEF DESCRIPTION OF THE DRAWINGS

FIG. 7 shows an embodiment of the present invention wherein the inverse map is stored in map blocks separate from the data blocks storing the write data.

DETAILED DESCRIPTION OF EMBODIMENTS OF THE INVENTION

Figure 1A:
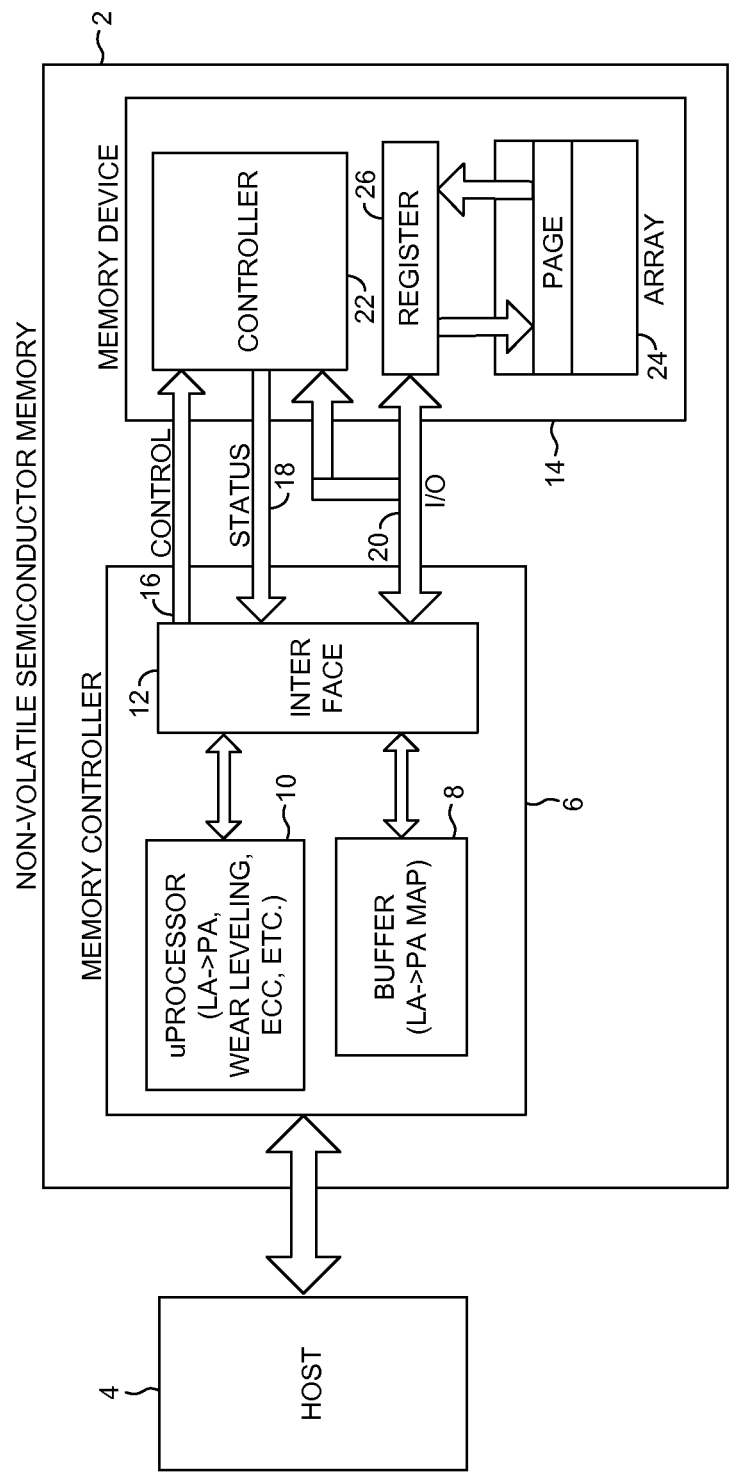
FIG. 1A shows a non-volatile semiconductor memory according to an embodiment of the present invention including a non-volatile memory array and control circuitry.

FIG. 1A shows a non-volatile semiconductor memory 2 communicating with a host 4 according to an embodiment of the present invention. Control circuitry 6 comprises a buffer 8 for buffering data for write/read commands, and a microprocessor 10 executing control programs for various algorithms, such as a logical block address (LBA) to physical block address (PBA) mapping, wear leveling, error correction code, etc. The control circuitry 6 further comprises interface circuitry 12 for interfacing with one or more memory devices 14, such as a suitable flash memory device. The interface circuitry 12 generates suitable control signals 16 and receives status information 18 from the memory device 14 in connection with executing write/read commands initiated by the microprocessor 10. The interface circuitry 12 also transmits and receives data over an I/O bus 20, including read/write data stored in the buffer 8 or command data generated by the microprocessor 10 and transmitted to a controller 22 integrated with the memory device 14.

The memory device 14 comprises a non-volatile memory array 24 including a plurality of bocks each comprising a plurality of pages. During a write operation, write data received over the I/O bus 20 from the buffer 8 is first stored in a data register 26. The controller 22 then transfers the write data from the data register 26 to a target page in the memory array 24. During a read operation, a page in the memory array 24 is read into the data register 26 and then transferred over the I/O bus 20 where it is stored in the buffer 8.

The control circuitry 6 maintains a translation table for mapping logical addresses received from a host into physical addresses representing memory segments (e.g., pages or partial pages) in the non-volatile memory array 24. In one embodiment, the entire translation table is generated and stored in a volatile memory (e.g., in the buffer 8) so that any logical address received from the host can be immediately mapped to its corresponding physical address. Due to its size, in one embodiment the translation table is never written to the non-volatile memory array 24. Instead, the translation table is rebuilt each time the non-volatile semiconductor memory 2 is powered on using inverse map stored in the non-volatile memory array 24.

Figure 1B:
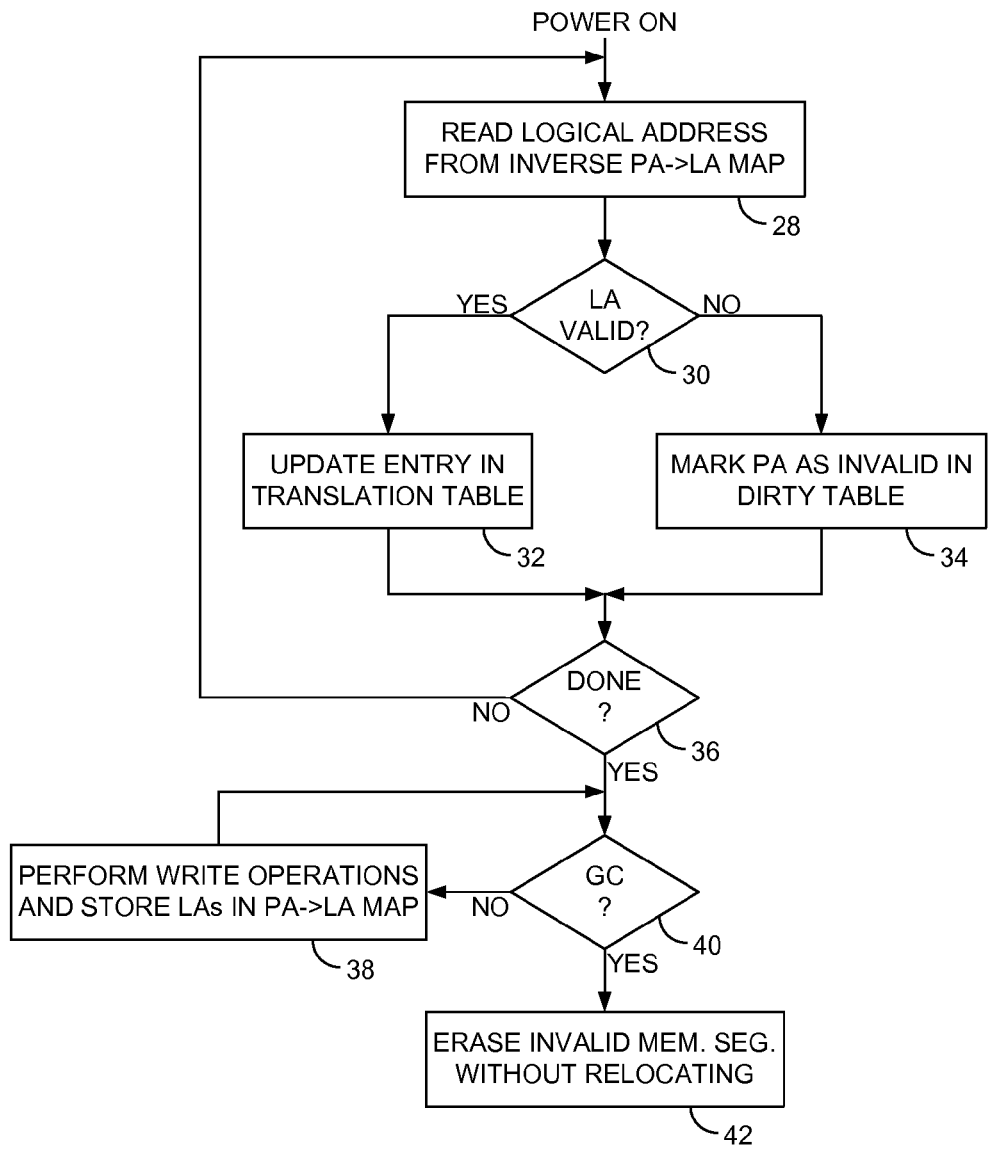
FIG. 1B is a flow diagram executed by the control circuitry according to an embodiment of the present invention wherein after a power failure a translation table and a dirty table are rebuilt by reading an inverse map from the non-volatile memory array.

FIG. 1B is a flow diagram according to an embodiment of the present invention wherein when the non-volatile semiconductor memory 2 is powered on, a logical address is read from an inverse map stored in the non-volatile memory array 24 (step 28). If the logical address is valid (step 30) meaning the corresponding physical address stores the most recent write data corresponding to the logical address, then a corresponding entry is updated in the translation table (step 32). If the logical address is invalid (step 30) meaning the corresponding physical address stores old write data, the physical address is marked as invalid in a dirty table (step 34). This process repeats (step 36) until the entire inverse map has been read from the non-volatile memory array 24. During normal operation, when a write command is received from the host the write data is stored in the non-volatile memory array 24, the translation table stored in the volatile memory is updated, and the inverse map (PA to LA) is updated and stored in the non-volatile memory array (step 38). During a garbage collection operation (step 40), invalid memory segments as identified by the dirty table are erased without being relocated (step 42), whereas valid memory segments are relocated. In one embodiment, an entire block in the non-volatile memory array 24 is erased after relocating any valid memory segments.

Figure 2:
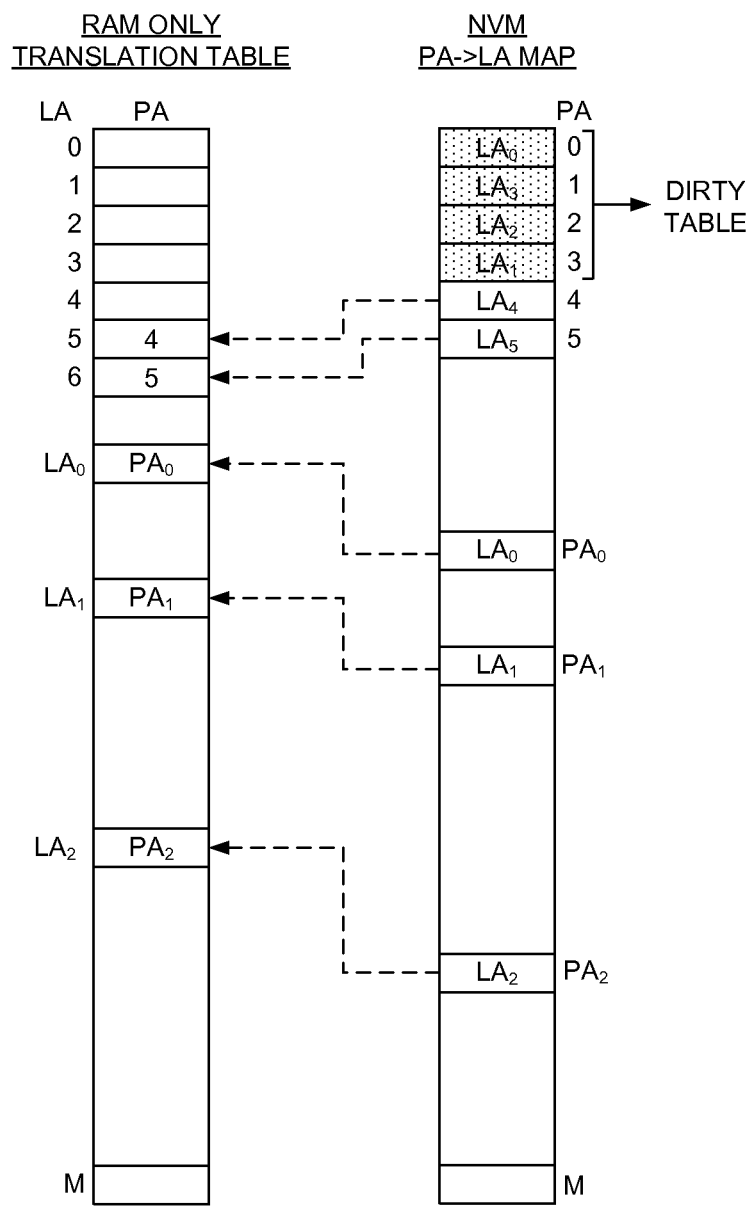
FIG. 2 shows an embodiment of the present invention wherein a translation table is rebuilt in a volatile RAM memory from the inverse map stored in the non-volatile memory array.

FIG. 2 shows an example translation table stored in volatile memory being reconstructed from an inverse map maintained in the non-volatile memory array 24. When a physical address is written to, the corresponding logical address is stored in the inverse map. When a logical address is overwritten during a subsequent write operation, the write data is stored in a new memory segment, and the inverse map entry for the new physical address updated with the logical address. Although the old physical address points to a memory segment storing the old write data, the old physical address is considered invalid. When the non-volatile semiconductor memory 2 is powered on, the entries in the inverse map are evaluated in order to rebuild the translation table and the dirty table in the volatile memory. In an embodiment described in greater detail below, the entries in the inverse map are processed in their chronological write order to determine whether a physical address is invalid (corresponding memory segment stores old write data). That is, if there are two or more entries in the inverse map storing the same logical address, the last written physical address is considered valid, and the older entries are considered invalid. In the example shown in FIG. 2, the first four entries of the inverse map store duplicate logical addresses, and therefore the physical addresses corresponding to the first four entries are marked invalid in the dirty table so the corresponding memory segments are erased without being relocated during the garbage collection operation.

Figure 3:
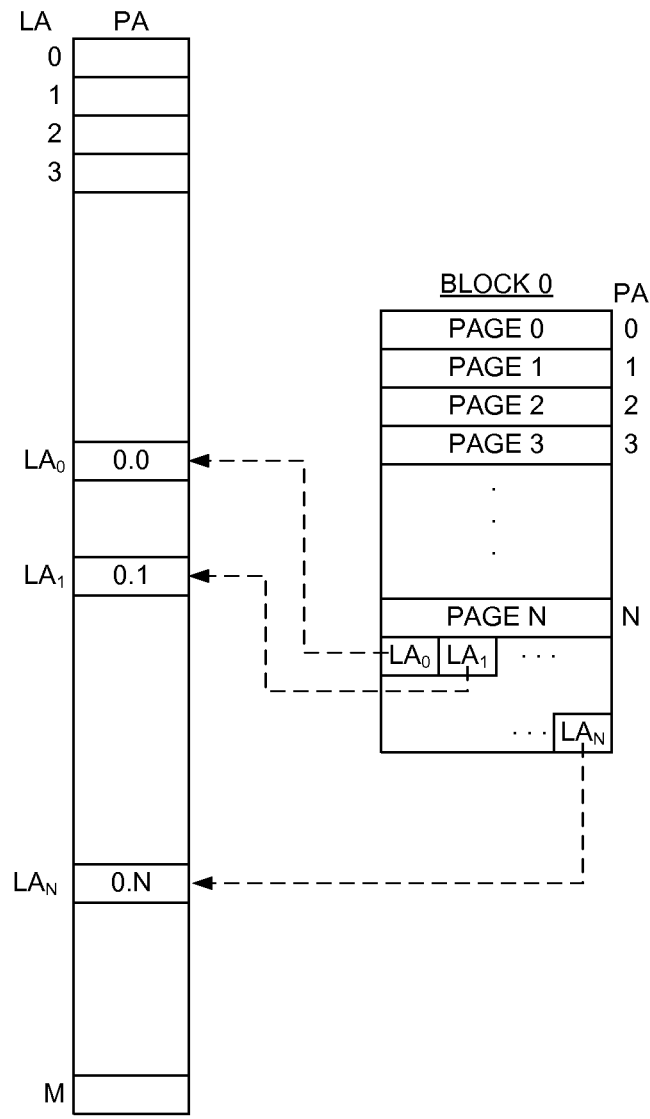
FIG. 3 shows an embodiment of the present invention wherein each block in the memory array stores the logical addresses for it's corresponding memory segments.

The inverse map may be stored in the non-volatile memory array 24 in any suitable manner. FIG. 3 shows an embodiment wherein each block comprises N data pages, and one or more reserved pages for storing the logical addresses for the memory segments of the block. When executing a write operation, the write data received from the host is stored in one or more of the data pages, and the corresponding logical addresses are stored in the reserve page(s). The order that the logical addresses are written to the reserved pages corresponds with the order of the data pages. For example, when data is written to the first memory segment of page 0, the corresponding logical address ($LA_0$) is stored as the first entry in the reserved pages.

When rebuilding the translation table during a power-on sequence, the blocks are read in the order they were written, and the reserved page(s) evaluated in order to load the physical addresses into the corresponding entries of the translation table. For example, the first physical address of block 0 may be represented as 0.0 which is loaded into the translation table at entry $LA_0$ (the logical address of the corresponding write operation). If the same logical address is encountered again in a reserved page of the same or different block, the corresponding entry in the translation table is overwritten with the new physical address (later written physical address), and the old physical address is marked as invalid in the dirty table.

Figure 4:
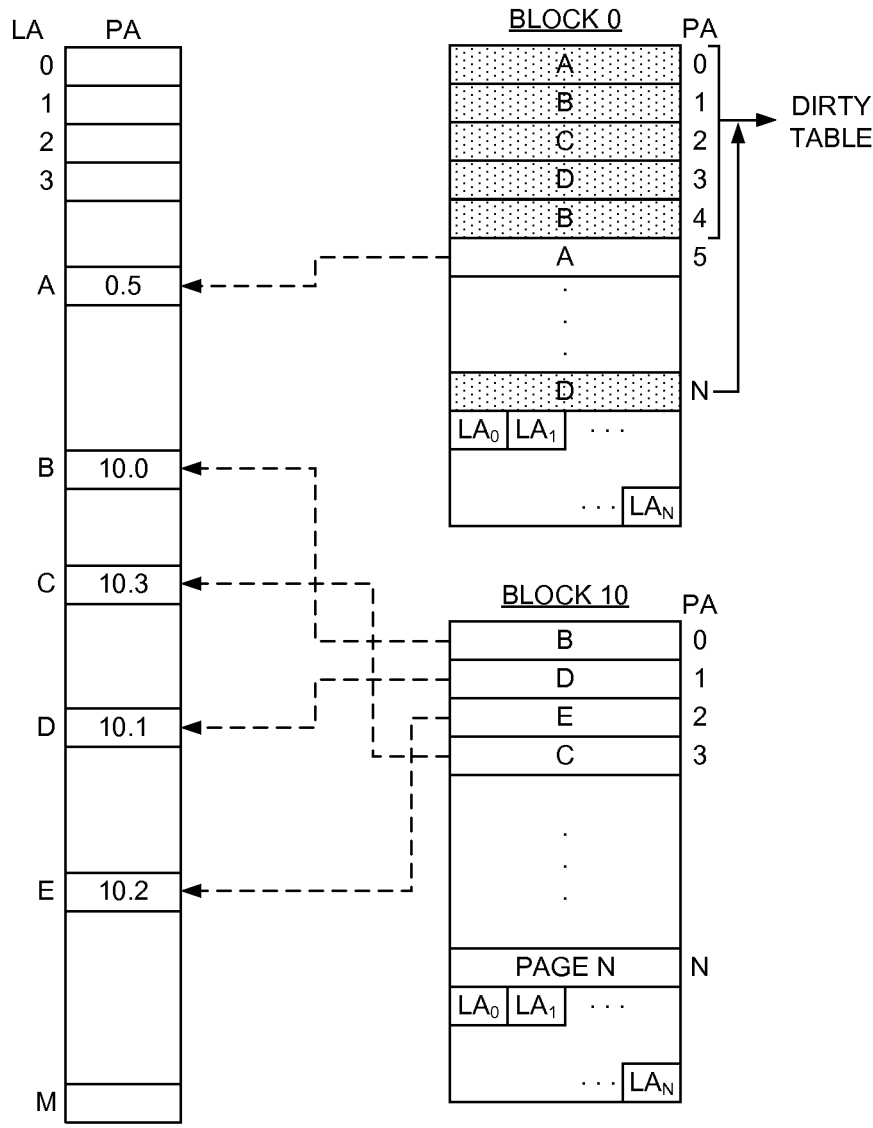
FIG. 4 illustrates write operations over multiple blocks and how the translation table is rebuilt based on the most recent logical addresses written according to an embodiment of the present invention.

FIG. 4 illustrates a number of write operations where the write data is first written to block 0, and when block 0 is full, the write data is written to block 10. The block allocated after a current block is filled may be selected in any suitable manner, such as with a wear leveling algorithm that spreads out the write operations evenly over the blocks. In the example of FIG. 4, write operations are performed on logical addresses A-E. For example, a first write operation for logical address A writes data to page 0 of block 0. A subsequent write operation for logical address A writes data to page 5 of block 0. Similar overwrites are illustrated for logical addresses B-D extending into the new block 10. When the translation table is rebuilt during a power-on sequence, the physical addresses corresponding to the most recent write operations are used to update the corresponding entries in the translation table, and the physical addresses corresponding to older write operations are marked invalid in the dirty table.

Figure 5:
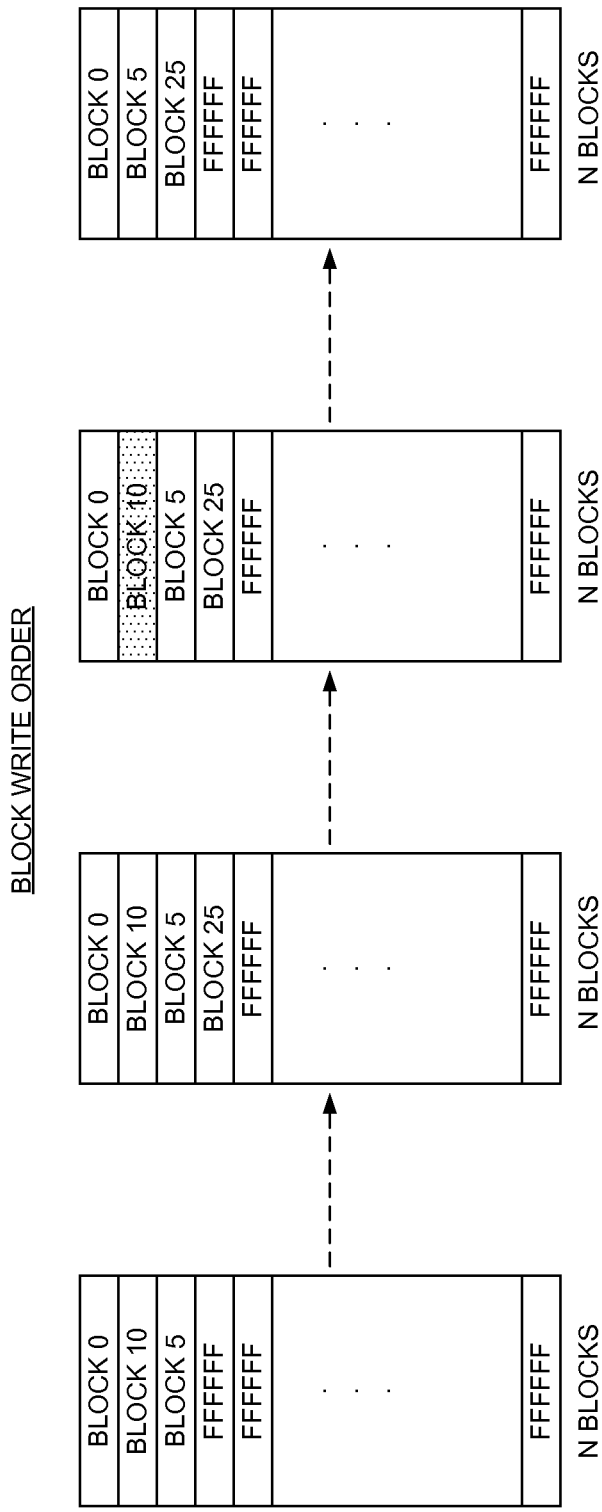
FIGS. 5A-5D illustrate an embodiment of the present invention wherein a chronological write order of the blocks is stored for use in rebuilding the translation table and dirty table.

In one embodiment, in order to determine the most recently written physical addresses, a chronological write order of the blocks is maintained during normal operation. FIGS. 5A-5D illustrate an embodiment wherein a write order table maintains the chronological write order of the blocks. The table comprises a number of entries equal to the total number of blocks, and in one embodiment all of the entries are initialized with an invalid block number (e.g., FFFFFF). FIG. 5A shows an example where the first three blocks written are blocks 0, 10, and then 5, wherein the rest of the table entries are invalid. FIG. 5B illustrates the next block written in the sequence is block 25. FIG. 5C illustrates an example wherein block 10 is erased during a garbage collection operation. After erasing block 10, it is removed from the table and the following entries moved up the list as illustrated in FIG. 5D. In one embodiment, the write order table is saved to the non-volatile memory array when a power failure is detected so that it is available during the next power on sequence.

Figure 6:
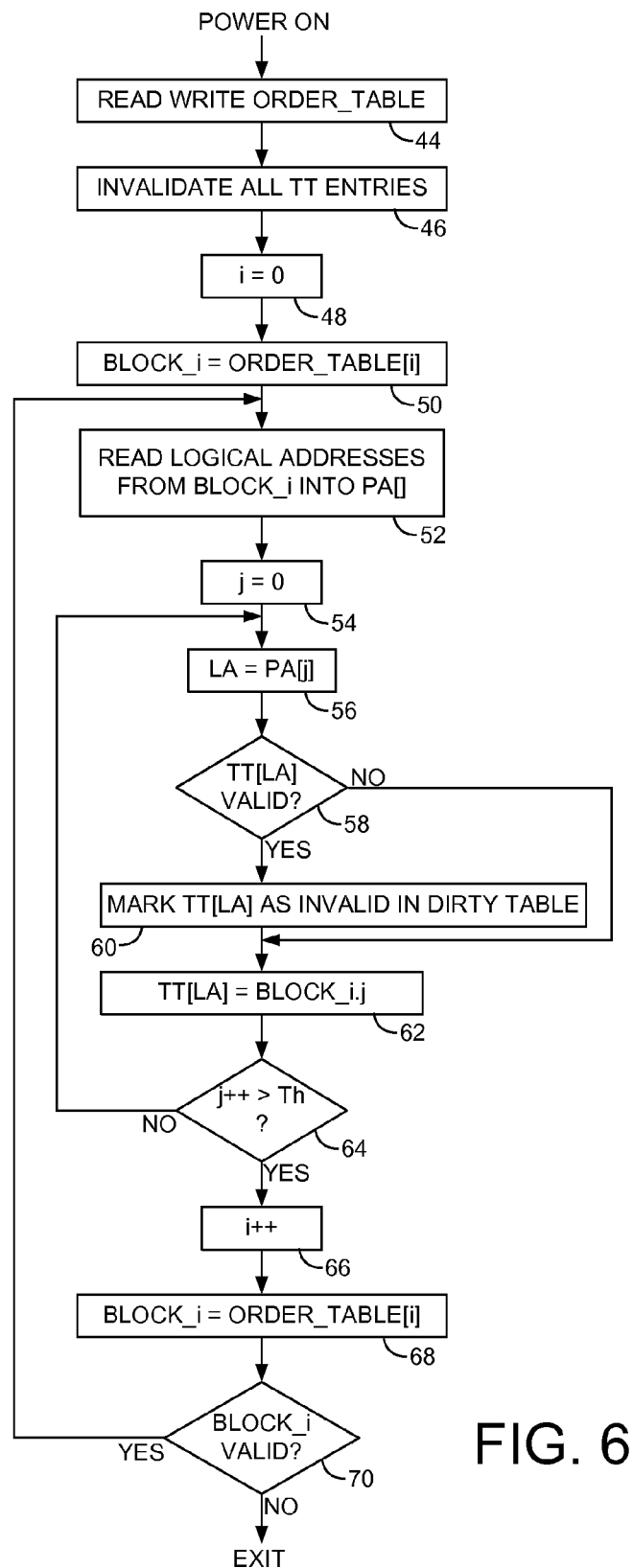
FIG. 6 is a flow diagram according to an embodiment of the present invention wherein the logical addresses are read from the blocks in chronological write order in order to rebuild the translation table and dirty table.

FIG. 6 is a flow diagram according to an embodiment of the present invention wherein when the non-volatile semiconductor memory is powered on, a write order table (such as shown in FIG. 5A) is read (step 44) and the entries of a translation table (TT) are invalidated (step 46). A block counter i is initialized to zero (step 48), and the first block number is read from the write order table (step 50). The logical addresses stored in the block are read into a PA array (step 52) and an address counter j is initialized to zero (step 54). The jth logical address from the PA array is read (step 56), and if the corresponding entry in the translation table comprises a valid entry (step 58), the physical address in the old entry is marked invalid in the dirty table (step 60). The translation table entry is then overwritten with the physical address of the current block (i.j) (step 62). The address counter j is incremented and if there are more logical addresses in the current block to process (step 64), the process is repeated starting with step 56. Once all of the logical address of the current block have been processed (step 64), the block counter i is incremented (step 66) and the next block number read from the write order table (step 68). The process is then repeated for the next block starting at step 52, until all the blocks in the write order table have been processed (i.e., until the block number at step 70 is invalid).

In the embodiment of FIG. 6, the block numbers are processed in chronological write order in order to determine whether a physical address should be marked as invalid in the dirty table when a later encountered physical address entry in the inverse map stores the same logical address. However, any suitable technique may be employed to determine whether to mark a physical address as invalid in the dirty table. In alternative embodiment, the block numbers in the write order table may be processed in reverse chronological order. In this embodiment, if a logical address entry in the translation table already stores a physical address, the physical address in the translation table remains unchanged and the newly encountered physical address is marked invalid in the dirty table.

The inverse map may be maintained in the non-volatile memory array in any suitable manner. In the embodiment shown in FIG. 3, each block stores the logical addresses in a reserved page as each memory segment within the block is written. In an alternative embodiment, the logical addresses for each write operation may be stored in a block separate from the written block. That is, the control circuitry may allocate blocks for storing the inverse map which are updated as each write operation is executed.

An example of this embodiment is shown in FIG. 7 wherein a plurality of blocks are allocated for storing the inverse map. After a block is filled with inverse mapping data, a new map block is allocated (e.g., from a pool of available blocks). During a garbage collection operation, as data blocks are erased the corresponding entries in the inverse map are marked as invalid. When all of the entries in a map block become invalid, the block is erased and re-inserted into the pool of available blocks.

In the embodiment of FIG. 7, the first page of a block is reserved for storing the block numbers of blocks written, and the following pages store the logical addresses of the write operations for each block number. Each page stores enough logical addresses to cover an entire data block. For example, the logical addresses for the first block number $BL_0$ are stored in page 1 of the map block, the logical addresses for the next block number $BL_1$ are stored in page 2 of the map block, and so on. In one embodiment, the write order of the map blocks is maintained so that the chronological write order of the data blocks can be determined and used to invalidate physical addresses when rebuilding the translation table as described above.

In one embodiment, when a data block is erased during a garbage collection operation, the block number is marked invalid in the inverse map. In the embodiment of FIG. 7, a block number may be changed to invalid using a read modify write operation. That is, the first page of the map block is read, the block number of the erased block is changed to all one bits, and then the modified page is written back to the map block. If an invalid block number (e.g., all ones) is encountered when rebuilding the translation table, the corresponding page of logical addresses is skipped. This embodiment may expedite the rebuild process, but is not necessary since the logical addresses of an erased block will all correspond to invalid physical addresses (physical addresses from previous write operations).

The control circuitry 6 in the non-volatile semiconductor memory (FIG. 1) may comprise any suitable circuitry, such as one or more integrated circuits. In one embodiment, the control circuitry 6 comprises a microprocessor 10 executing code segments of a control program for implementing the above described flow diagrams. Alternatively, or in addition to the microprocessor 10, the control circuitry 6 may comprise state machine circuitry implemented in an application specific integrated circuit.

What is claimed is:

1. A non-volatile semiconductor memory comprising:
   a non-volatile memory array including a plurality of blocks with at least some of the plurality of blocks comprising a plurality of memory segments and with at least some of the plurality of memory segments each assigned a physical address;
   a volatile memory; and
   control circuitry operable to:
   upon a power-up of the non-volatile semiconductor memory, generate, in the volatile memory, a translation table for mapping logical addresses to physical addresses in the non-volatile memory array, the control circuitry operable to generate by at least:
   reading at least one entry comprising a logical address from an inverse map stored in the non-volatile memory array, wherein the logical address corresponds to a physical address of one of the memory segments; and
   in response to determining that the memory segment corresponding to the logical address is valid, updating the translation table using the logical address.

2. The non-volatile semiconductor memory of claim 1, wherein the control circuitry is operable to generate substantially the entire translation table by reading logical addresses from the non-volatile memory array.

3. The non-volatile semiconductor memory of claim 1, wherein the control circuitry is further operable to maintain a chronological write order of the plurality of memory segments.

4. The non-volatile semiconductor memory of claim 3, wherein the chronological write order is maintained in a write order table.

5. The non-volatile semiconductor memory of claim 4, wherein the write order table is saved to the non-volatile memory array when a power failure is detected.

6. The non-volatile semiconductor memory of claim 3, wherein the control circuitry is further operable to generate the translation table based on the chronological write order.

7. The non-volatile semiconductor memory of claim 6, wherein the control circuitry is further operable to generate the translation table based on the chronological write order by reading logical addresses from the non-volatile memory array in the chronological write order or in a reverse order from the chronological write order.

8. The non-volatile semiconductor memory of claim 3, wherein the control circuitry is further operable to determine whether a memory segment is invalid based on the chronological write order.

9. The non-volatile semiconductor memory of claim 1, wherein the control circuitry is further operable to:
   receive a write command from a host; and
   update the translation table based on the received write command.

10. The non-volatile semiconductor memory of claim 1, wherein a first block of the non-volatile memory array comprises the logical address of the inverse map and the corresponding memory segment.

11. The non-volatile semiconductor memory of claim 1, wherein a first block of the non-volatile memory array comprises the logical address of the inverse map and a second block of the non-volatile memory array comprises the corresponding memory segment.

12. The non-volatile semiconductor memory of claim 1, wherein each of the plurality of blocks comprises a plurality of memory segments with each of the plurality of memory segments assigned a physical address.

13. A method of operating a non-volatile semiconductor memory comprising (1) a non-volatile memory array including a plurality of blocks with at least some of the plurality of blocks comprising a plurality of memory segments and with at least some of the plurality of memory segments each assigned a physical address and (2) a volatile memory, the method comprising:
 upon a power-up of the non-volatile semiconductor memory, generating, in the volatile memory, a translation table for mapping logical addresses to physical addresses in the non-volatile memory array, the generating comprising:
  reading at least one entry comprising a logical address from an inverse map stored in the non-volatile memory array, wherein the logical address corresponds to a physical address of one of the memory segments; and
  in response to determining that the memory segment corresponding to the logical address is valid, updating the translation table using the logical address.

14. The method of claim 13, wherein substantially the entire translation table is generated by reading logical addresses from the non-volatile memory array.

15. The method of claim 13, further comprising maintaining a chronological write order of the plurality of memory segments.

16. The method of claim 15, wherein the chronological write order is maintained in a write order table.

17. The method of claim 16, further comprising saving the write order table to the non-volatile memory array when a power failure is detected.

18. The method of claim 15, wherein the generating of the translation table is based on the chronological write order.

19. The method of claim 18, wherein the generating of the translation table is based on the chronological write order by reading logical addresses from the non-volatile memory array in the chronological write order or in a reverse order from the chronological write order.

20. The method of claim 15, further comprising determining whether a memory segment is invalid based on the chronological write order.

21. The method of claim 13, further comprising:
 receiving a write command; and
 updating the translation table based on the received write command.

22. The method of claim 13, wherein each of the plurality of blocks comprises a plurality of memory segments with each of the plurality of memory segments assigned a physical address.

\* \* \* \* \*